US006423924B1

(12) United States Patent
Goloviatinskii et al.

(10) Patent No.: US 6,423,924 B1
(45) Date of Patent: Jul. 23, 2002

(54) METHOD FOR TREATING THE SURFACE OF A MATERIAL OR AN OBJECT AND IMPLEMENTING DEVICE

(75) Inventors: Serguei Goloviatinskii; Stanislav Begounov, both of Yverdon-les-Bains (CH)

(73) Assignee: Tepla AG, Munich (DE)

( * ) Notice: Subject to any disclaimer, the term of this patent is extended or adjusted under 35 U.S.C. 154(b) by 0 days.

(21) Appl. No.: 09/646,001

(22) PCT Filed: Mar. 10, 1999

(86) PCT No.: PCT/CH99/00113

§ 371 (c)(1), (2), (4) Date: Oct. 23, 2000

(87) PCT Pub. No.: WO99/46964

PCT Pub. Date: Sep. 16, 1999

(30) Foreign Application Priority Data

Mar. 10, 1998 (CH) ........................................ 0571/98

(51) Int. Cl.[7] ........................................ B23K 10/00

(52) U.S. Cl. ........................ 219/121.59; 219/121.52; 219/121.4

(58) Field of Search ..................... 219/121.47, 121.59, 219/121.36, 121.43, 121.4; 204/298.21; 156/345; 427/562, 569, 571, 575

(56) References Cited

U.S. PATENT DOCUMENTS

| | | | | |
|---|---|---|---|---|
| 3,786,306 A | | 1/1974 | Schoumaker | |
| 5,908,565 A | * | 6/1999 | Morita et al. | 219/121.43 |
| 5,985,378 A | * | 11/1999 | Paquet | 427/562 |
| 6,100,496 A | * | 8/2000 | Takuya et al. | 219/121.52 |

FOREIGN PATENT DOCUMENTS

| | | |
|---|---|---|
| FR | 2458897 A | 1/1981 |

OTHER PUBLICATIONS

A. Tslaf: "Temperature of an electric arc in a narrow insulting channel" Proceedings of the IEE, vol. 126, No. 2, Feb., 1979, pp. 209–213, XP002104430.

* cited by examiner

*Primary Examiner*—Mark Paschall
(74) *Attorney, Agent, or Firm*—Clifford W. Browning; Woodard, Emhardt, Naughton Moriarty & McNett

(57) ABSTRACT

The invention relates to a method of treating the surface of a material or of an object by means of plasma generated by an electric discharge. It also relates to a device for implementing the method. The electric discharge is stabilized by confining said plasma in the form of at least one string, and the surface treatment is performed by putting the surface in contact with the plasma string along said string.

24 Claims, 7 Drawing Sheets

FIG.1
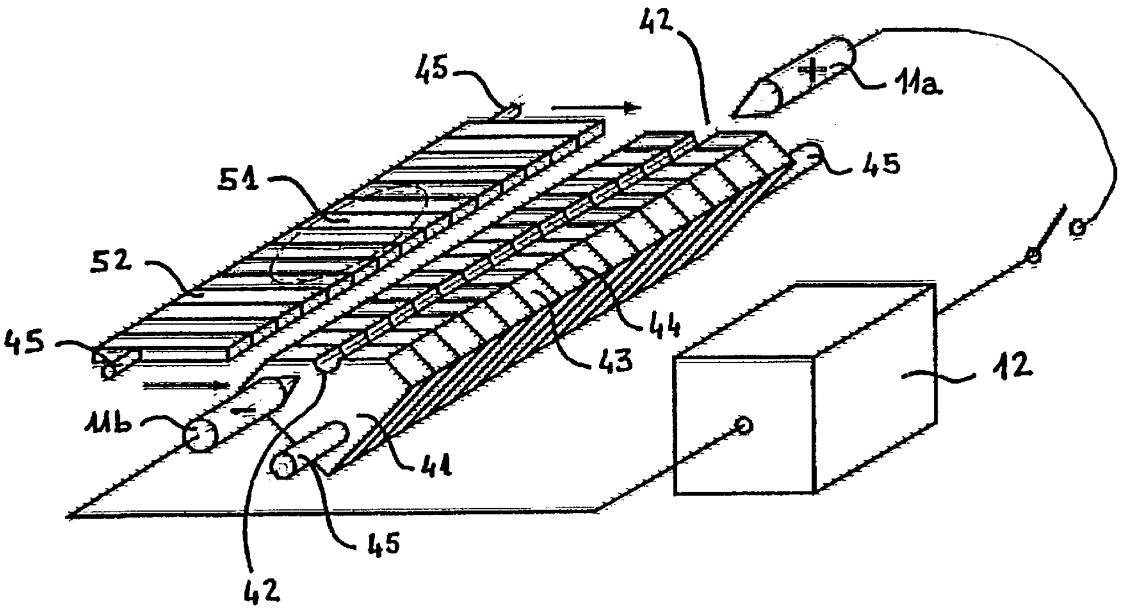
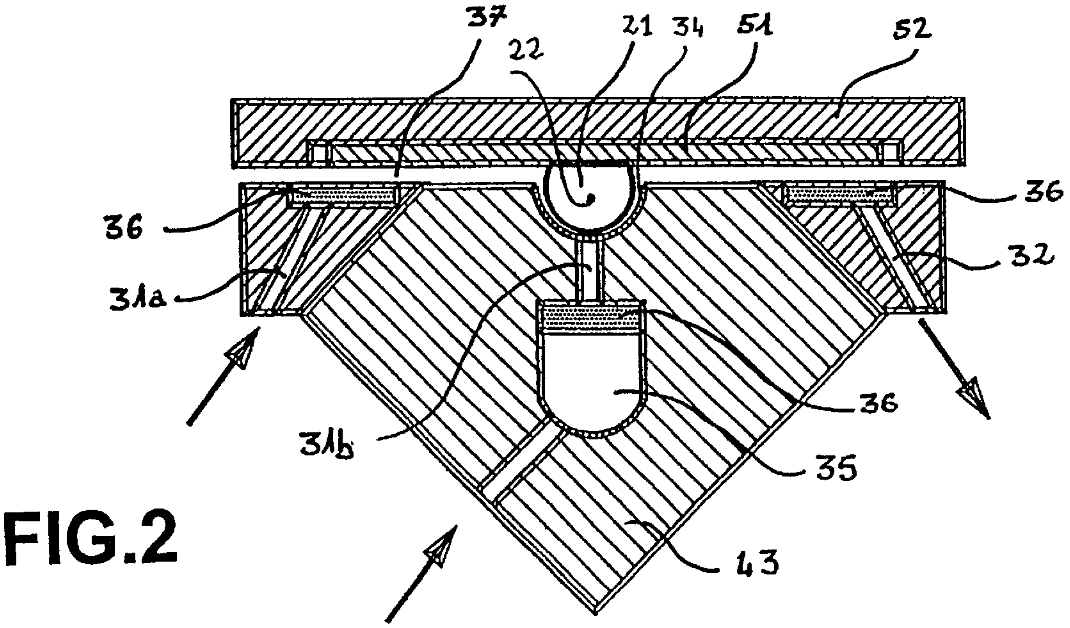
FIG.2

METHOD FOR TREATING THE SURFACE OF A MATERIAL OR AN OBJECT AND IMPLEMENTING DEVICE

FIELD OF THE INVENTION

The present invention relates to a method of treating the surface of a materiel or of an object by means of plasma generated by an electric discharge, and to a device for implementing the method.

BACKGROUND OF THE INVENTION

A plasma generator is described in International Patent Application WO 97/18693. That generator makes it possible to obtain a jet of plasma in the form of a curtain. The parameters of that plasma, such as, for example, its temperature or its composition, are uniform along the curtain, in a direction perpendicular to the direction of the plasma flow.

By using that “curtain” plasma jet technology, various types of surface treatment can be performed, by subjecting the surface under treatment to a substantially orthogonal spray of plasma onto the surface to be treated, so as, in particular, to perform cleaning, stripping, or sterilization of the surface, or else so as to coat it with a film.

Unfortunately, the low energy efficiency obtained when implementing that curtain plasma jet technology is not conducive to its development.

It has been observed that the quantity of energy from the plasma that is available for performing the surface treatment is small compared with the quantity of energy required for generating the plasma curtain. This is due to heat dissipation, but also to loss of activated particles from the plasma, caused by thermal convection, diffusion, and conduction phenomena in the vicinity of the plasma curtain. In addition, that type of plasma loses a large amount of its activity as it moves away from the jet source.

It has also be observed that generating such plasmas is accompanied by high emission of ultraviolet radiation, which can even give rise to photo-ionization of the material whose surface is being treated.

That phenomenon, probably due to the relatively high thickness of the layer of the plasma curtain, is a disadvantage in micro-electronics, which is a field in which surface irradiation with ultraviolet rays must be particularly well controlled, e.g. when certain treatment operations are performed on silicon wafers.

Finally, that curtain plasma jet technology is not suitable for performing the treatment by sweeping surfaces of large dimensions or surfaces that are not plane.

An object of the present invention is to make it possible, with good energy efficiency, to treat the surface of a material or of an object of any dimensions and/or of any shape by means of plasma having a small optical thickness, thereby emitting only a very small amount of ultraviolet rays, and conserving a very high activity in the surface treatment zone.

SUMMARY OF THE INVENTION

To this end, the invention provides a method of treating the surface of a material or of an object by means of plasma generated by an electric discharge, in which method said discharge is stabilized by confining said plasma in the form of at least one string, and the surface treatment is performed by putting the surface in contact with the plasma string along said string.

The method offers, in particular, the advantage of conserving a very high level of activity in the surface treatment zone because the reactive particles of the plasma are generated in the immediate vicinity of the surface under treatment.

Various variants of the method of the invention are defined in particular by the characteristics of the sub-claims, namely:

- a variant wherein said surface to be treated and said plasma string are subjected to a relative sweeping movement, the direction of the sweeping movement being different from the direction of the axis of said string.
- a variant wherein said discharge is stabilized by confining said plasma string within at least one channel constituted in part by the surface under treatment.
- a variant wherein another portion of said channel is constituted by an essentially dielectric wall in the form of a trough.
- a variant wherein the composition of said plasma is sustained by a flow of gas particles, the flow being inserted and removed in a same section plane of the plasma string, perpendicular to the direction of the string, so as to control the composition of the plasma locally while avoiding any longitudinal dissipation of the plasma.
- a variant wherein the insertion and removal of said gas particles is distributed along the plasma string.
- a variant wherein the plasma string is subjected to the action of a magnetic field angularly positioned in a direction different from the direction of the axis of the plasma string, so as to create an Ampère force that influences the position of the axis of the string as a function of the nature of the desired treatment.
- a variant wherein said electric discharge is fed with DC or AC emitted between two electrodes, each of which is constituted by a plasma jet whose axis intersects the axis of the plasma string, the direction of each of the jets being different from the direction of the electric discharge.
- a variant wherein said electric discharge is fed by an AC source and wherein said discharge is stabilized by means of an electrode disposed along the surface to be treated.
- a variant wherein the discharge is fed by a pulsed current source, the surface treated discontinuously in strips or bands and a plurality of sweeping passes are performed in order to treat the entire surface.

The invention also provides a device for implementing the method, the device being characterized in that it includes at least two electrodes organized to emit an electric discharge, and means for stabilizing said electric discharge by confining the plasma in the form of at least one string, said device being organized to perform the surface treatment by bringing the surface into contact along the plasma string.

In a first embodiment of the device, the means for stabilizing the electric discharge and for confining the plasma in the form of at least one string may comprise at least one channel constituted in part by the surface under treatment, it being possible for another portion of said channel to be constituted by an essentially dielectric wall in the form of a trough.

Devices are already known that make it possible to stabilize an electric discharge within a channel. That type of device, which may be referred to as a “diaphragm-stabilized plasmatron”, makes it possible to insert with strength that can be varied the column of an electric discharge into a series of diaphragms in alignment. A device of that type is described by W. Finkelnburg and H. Maecker in "Electrische Bögen und thermisches Plasma", Handbuch der Physik, Ed. A Flügge, Vol XXII, Gasentladungen II, Springer Verlag, Berlin, 1956, pp 254–444.

However, that type of device is used only to generate plasma jets and no applications of that jet technology propose or suggest treating some or all of the inside surfaces of the diaphragms, or causing the surface under treatment to take part in any way in stabilizing the electric discharge.

In the device of the invention, the material or the object whose surface is to be treated may be secured to a moving support. In which case, the surface of the support may also take part in stabilizing said plasma in the form of a string.

The channel for stabilizing the discharge and inside which the plasma string is confined may be constituted firstly by a wall in the form of a trough and secondly by the surface under treatment that covers said trough. By means of the essentially dielectric properties of the walls of the channel, the electric discharge current is forced to pass through it. The discharge is thus stabilized in said channel. The plasma generated by the electric discharge is contained in the channel and takes the form of a string. However, it does not fully match the outline of the section of the channel.

The section of the trough-shaped wall may be of any shape, curved or angular, and it may vary along the channel. Preferably, said section is circular in shape over the entire length of the channel.

Preferably, the ratio between the size of the section of trough-shaped channel and its length is less than 0.5. Preferably, the size of the section of the channel is constant along said channel.

The surface to be treated can be subjected to a relative sweeping movement, in a direction that is different from the direction of the axis of the plasma string, so that the entire surface to be treated is put in contact with the plasma.

The surface to be treated may be of any shape. It may be a plane surface such as the surface of a sheet, of a film, or of a solid plate, or a surface of the "corrugated" type, or even a complex surface of a three-dimensional object such as the surface of a bottle, or of a portion of bodywork. In which case, the plasma string is organized to adapt to match the shape of the surface to be treated. In particular, the channel containing the plasma string may be provided in a flexible material, thereby making it possible to cause its geometrical shape to vary on sweeping a surface to be treated that is of complex shape.

Optionally, by generating a magnetic field passing through the plasma string, and depending on the relative angular positioning of its Ampère force relative to the direction of the plasma string that is created by the DC electric discharge, it is possible, in particular, to confine the plasma string either against the wall of the trough, thereby increasing the stabilization of the electric discharge, or against the surface to be treated, thereby increasing the effectiveness of the treatment.

In another embodiment, the device of the invention includes at least one "side" electrode, encased in a dielectric body and disposed along the surface under treatment, so as to stabilize said electric discharge.

DETAILED DESCRIPTION OF PREFERRED EMBODIMENTS

Other characteristics of the method and of the device of the invention appear from the following description given by way of example and with reference to the drawings, in which:

FIG. 1 is a perspective view of a first embodiment of the device for implementing the method of the invention;

FIG. 2 is a cross-section view of the device shown in FIG. 1;

Figure 5A:
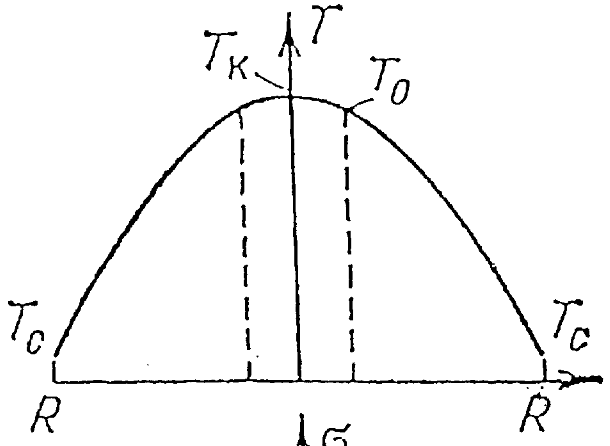
Figure 5B:
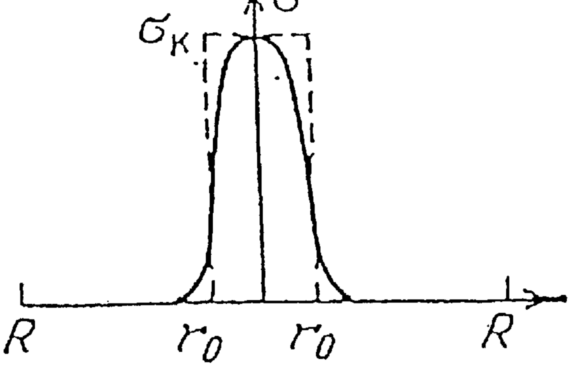
Figure 6:
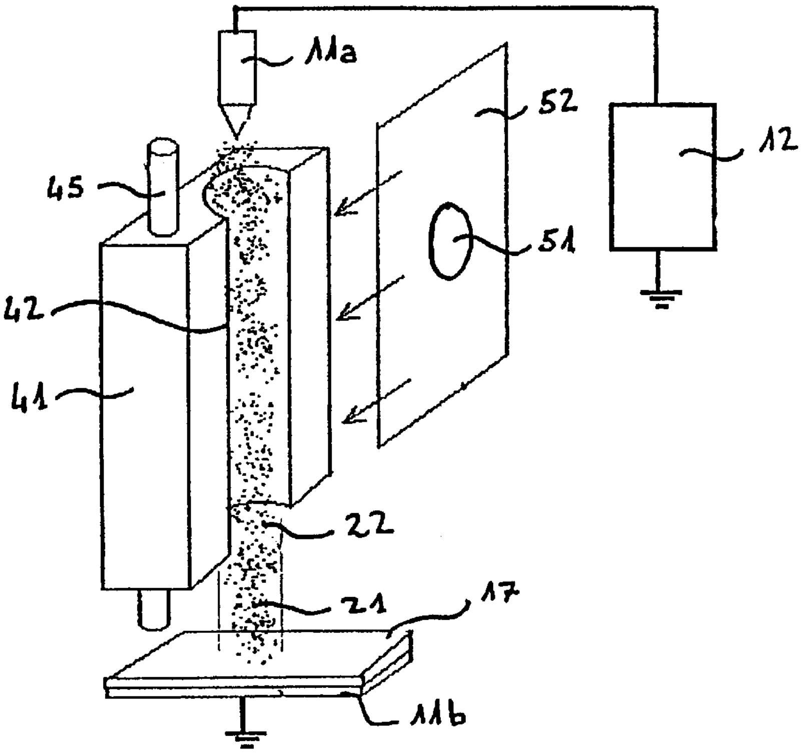
Figure 8:
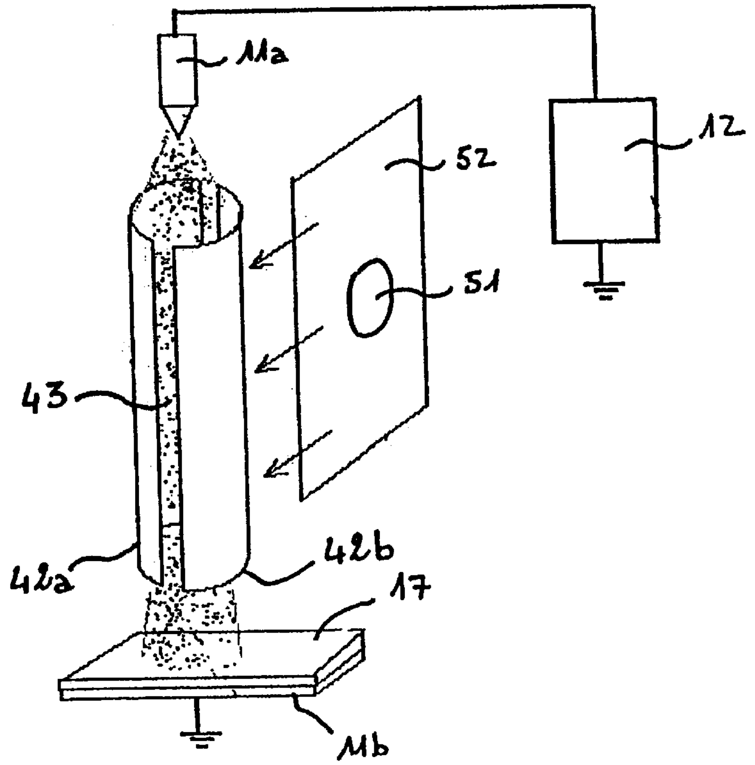
Figure 7:
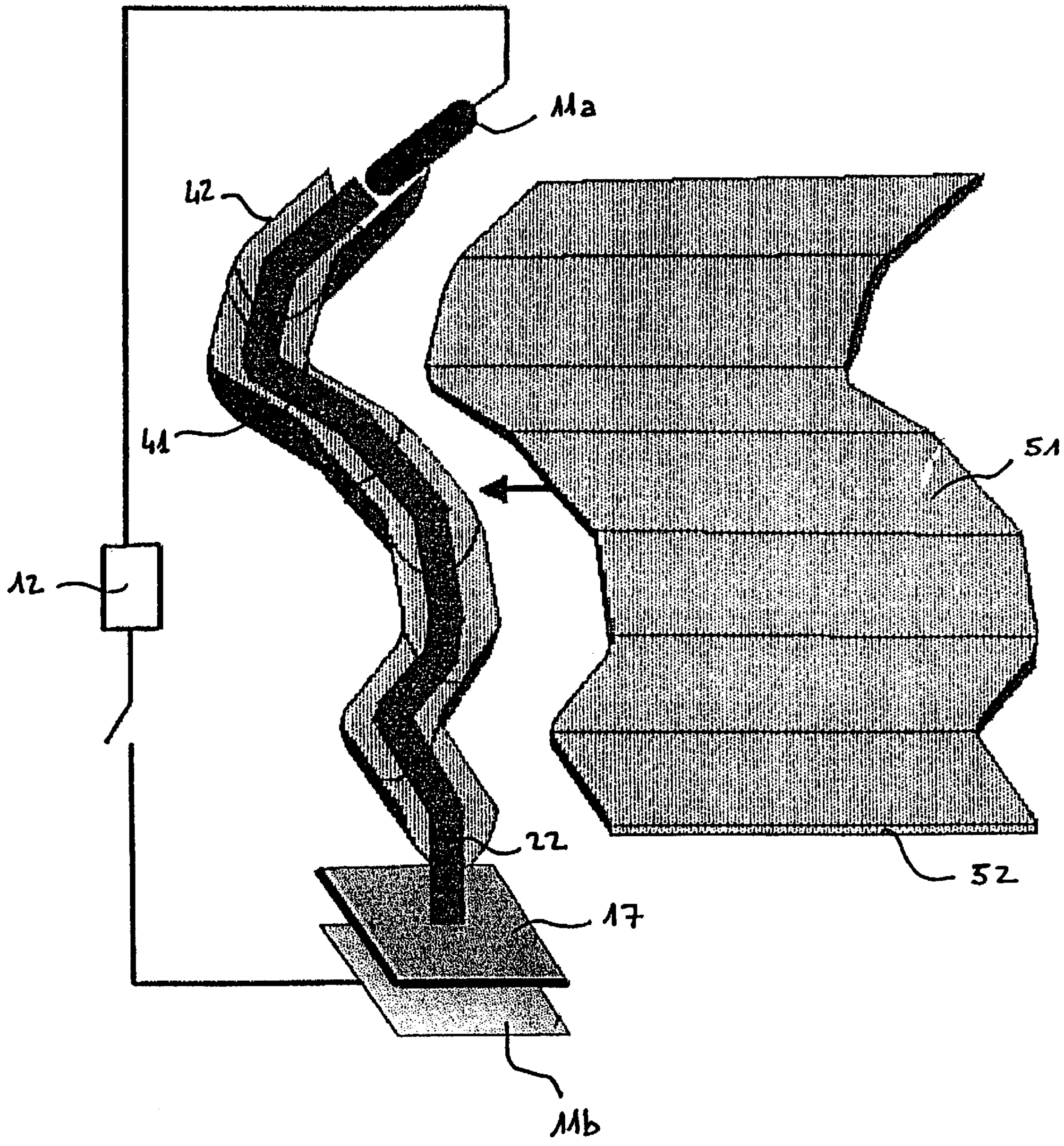
Figure 9A:
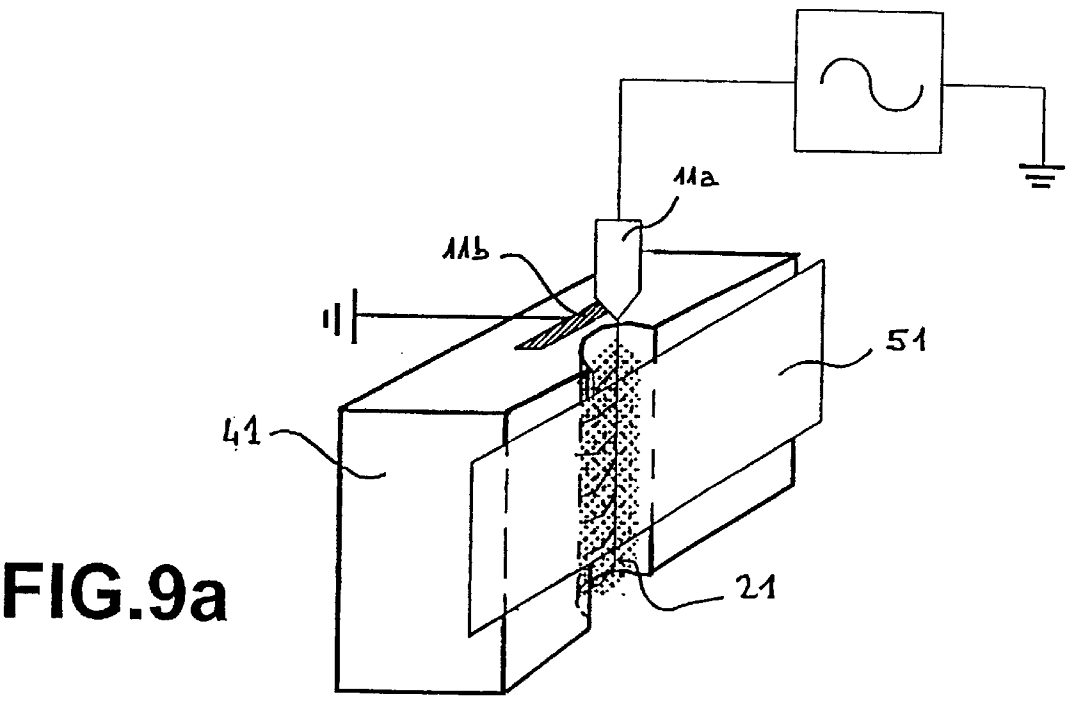
Figure 9B:
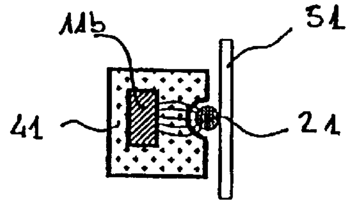
Figure 9C:
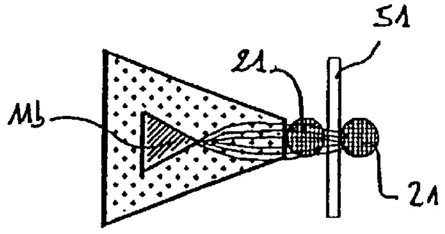
Figure 9D:
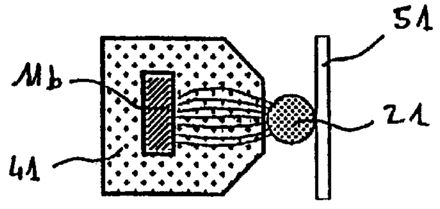
Figure 9E:
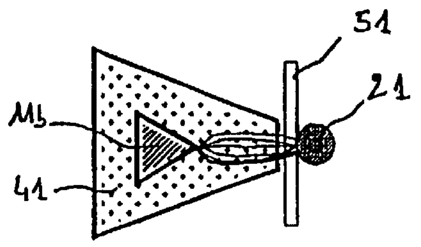

FIGS. 5*a* and 5*b* respectively show how the temperature and how the electrical conductivity of a plasma string vary radically starting from the central axis of the string;

FIG. 6 is a diagrammatic perspective view showing a fourth embodiment of the device for implementing the method of the invention;

FIG. 7 is a diagrammatic perspective view showing a fifth embodiment of the device for implementing the method of the invention;

FIG. 8 is a diagrammatic perspective view showing a sixth embodiment of the device for implementing the method of the invention;

FIGS. 9*a* and 9*b* are diagrams respectively in perspective and in cross-section showing a seventh embodiment of the device for implementing the method of the invention;

FIGS. 9*c* , 9*d* and 9*e* are cross-section views of three variants of the device shown in FIG. 9*a;*

Figure 10A:
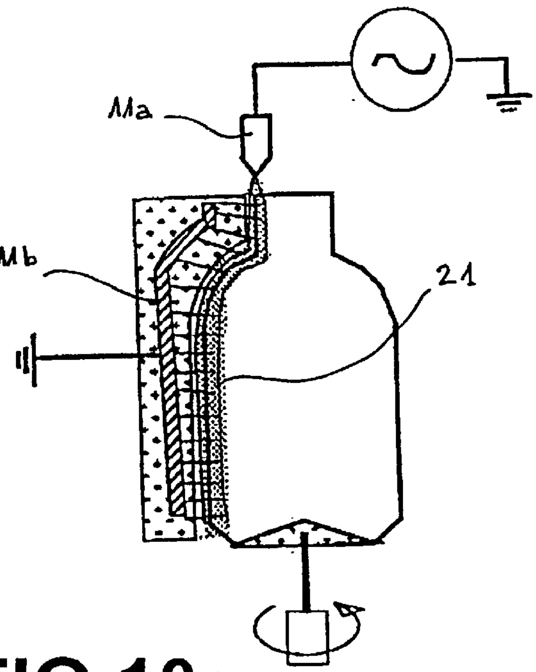
Figure 10F:
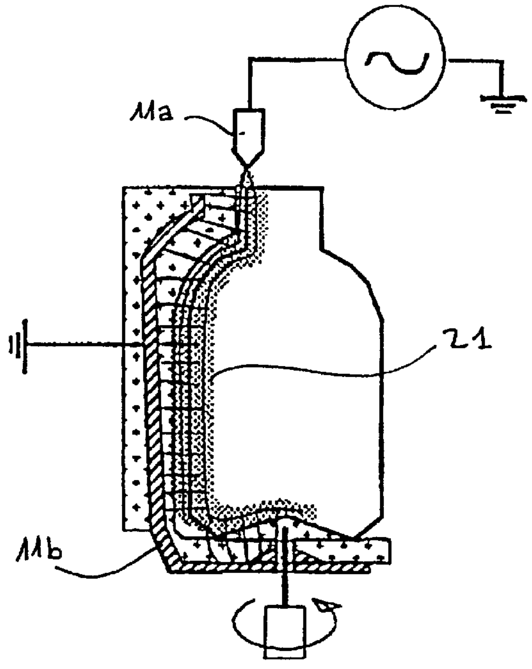
Figure 10B:
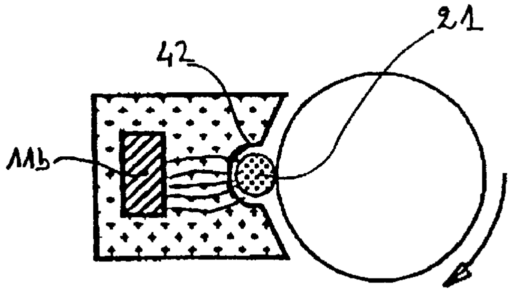
Figure 10D:
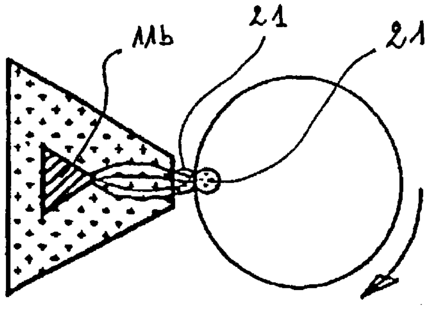
Figure 10C:
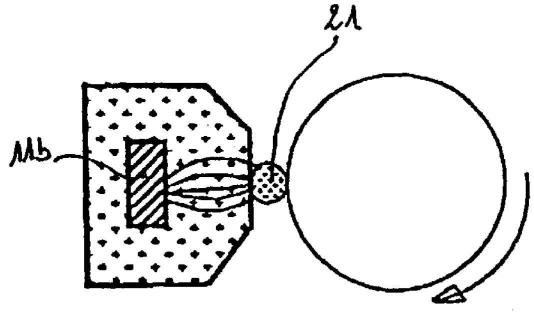
Figure 10E:
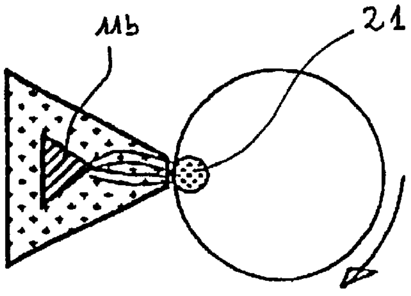

FIGS. 10*a* and 10*b* are two views, one of which is in vertical section, and the other is in cross-section, diagrammatically showing an eighth embodiment of the device for implementing the method of the invention;

FIGS. 10*c* to 10*e* are cross-section views of three variants of the device shown in FIG. 10*a*; and FIG. 10*f* shows a variant of the device shown in FIG. 10*a*.

In the embodiment of the device shown in FIGS. 1 and 2, an anode 11*a* and a cathode 11*b* are connected to a DC source 12, and they emit an electric discharge into a cavity 42 in the form of a trough of circular cross-section, the two electrodes constituted, for example, by metal poles, e.g. made of tungsten or of copper, being positioned in alignment with the axis of the cavity 42. In a variant, the electrodes may be connected to an AC or pulse current source.

The cavity 42 which is partially circularly cylindrical in shape is provided in a body comprising an assembly 41 of diaphragms. The body is made up of a series of heat-conductive elements 43, e.g. in the form of metal blades that are insulated from one another by electrically-insulating gaskets 44. The insulating gaskets serve to impart essentially dielectric properties to the assembly 41 of diaphragms. Each of the elements and each of the gaskets is disposed essentially perpendicularly to the direction of electric discharge.

Firstly because of the plasma being heated up by the Joule effect, caused by the current flowing, and secondly because of the thermal conductivity of the elements 43, it can be advantageous to equip the assembly 41 of diaphragms with cooling means 45. For example, these means consist in causing cooling fluid to flow internally.

As shown in FIGS. 1 and 2, the material 51 whose surface is to be treated is supported by a moving part 52. The moving part is also made up of a series of heat-conductive elements, insulated from one another by electrically-insulating gaskets. It may also be equipped with cooling means 45 so as to remove any excess heat.

An electric current emitted between the two electrodes 11, so that it flows within the internal cavity 34 containing gas particles, causes an electric discharge 21 by generating a plasma 22. By means of the essentially dielectric properties of the materials constituting all of the walls of the internal cavity, the electric discharge is stabilized inside said cavity, and the plasma is confined therein.

To enable the surface of the material 51 to be treated, it is necessary for the plasma 22 to be in contact with the surface, which is indeed the case because, by taking part in stabilizing the electric discharge, said surface is flush with the plasma string, in a plane tangential to the string.

When the surface is treated by sweeping, the speed of the sweeping movement is chosen, in particular, so that the local heating by the plasma is compensated by the displacement, by establishing a non-steady exchange of heat between the plasma and the surface under treatment. In this way, the local temperature of the surface under treatment is determined by the parameters of said plasma (current density, amplitude of the electric field, and others), and by the speed of displacement of the surface relative to the plasma.

As shown in FIG. 1, the surface to be treated 51 is swept by displacing the surface 51 relative to the block 41 in the direction indicated by the arrows. Naturally, this sweeping may also be obtained by displacing the block 41, with the surface 51 remaining stationary.

The section shown in FIG. 2 is a section through an above-described element 43, as well as through the material 51 whose surface is to be treated and which is supported by a metal element of the moving part 52. It shows the partially circular shape of the cross-section of the internal cavity 34.

It can be observed that the material 51, whose surface is to be treated, is separated from the element 43 by a gap 37. A duct 31*a* opens out into said gap 37. This duct constitutes one of the possible means for inserting gas particles, enabling the plasma to be generated and then to be sustained. Other insertion means, represented by the duct 31*b*, are incorporated in the element 43.

The gas particle insertion means are organized to guide the gas flow in a predetermined direction. Preferably, this direction lies in a plane perpendicular to the axis of the plasma string so as not to feed in any hydrodynamic components that could disturb the properties of the plasma along its string, and that could cause the plasma to dissipate in the direction of its axis.

Depending on the desired applications, the gas particles may be inserted along the surface to be treated, e.g. via the duct 31*a*, either upstream from the sweeping of the surface to be treated or downstream therefrom. When the gas particles are inserted upstream, the duct 31*a* may be angularly positioned so that the flow of the particles is guided in the opposite direction to the direction of sweeping of the surface to be treated. The gas particles may also be inserted in the direction passing across the axis of the plasma string, e.g. via the duct 31*b*. Any other direction may be considered. The various gas particle insertion means may be used separately or in combination.

Porous parts 36 are placed across the insertion ducts so as to regulate the flow of activatable gas particles, and so as to avoid any hydrodynamic disturbance. However, the method of the invention may also be implemented without the porous parts, by replacing the ducts 31*a* and/or 31*b* by longitudinal slots that are fine enough to constitute high hydrodynamic resistance to the flow of gas particles, so as to guarantee uniform distribution of said particles.

Expansion chambers 35 may optionally be interposed within the ducts so as to regulate the gas pressure.

The means for removing the gas particles which are activated in part, are disposed similarly to the insertion means. In this example, a removal duct 32 starts from the gap and extends along surface under treatment. For certain applications, it is necessary to organize the removal duct 32 so that the particles or product to be removed are as little as possible in contact with the surface under treatment. For this purpose, the distance between the inlet of the removal duct 32 and the plasma string must be minimized. Depending on the types of product to be removed, it can be necessary to remove the porous parts 36 from the removal duct 32 in order to avoid any closing off of that duct.

The device may be organized to make it possible to alternate the flow direction of the gas particles to be inserted and to be removed, by alternating the insertion and removal functions of the ducts 31*a* and 32.

In order to avoid any damage that can be caused by overexposure of the surface under treatment either to the activated gas particles or to the particles or products to be removed, it is possible, in particular to organize the device in one of the two following manners.

In the first manner, the activatable gas particles are inserted upstream from the sweeping of the surface to be treated, and they are guided towards the plasma string, and the products to be removed are removed downstream. In which case, care is taken to ensure that firstly there is no interaction between said particles and the surface to be treated until said surface passes over the plasma string, and secondly the products to be removed do not interact with the treated surface downstream from the string, e.g. by re-depositing on it during stripping treatment.

In the second manner, the activatable gas particles are inserted downstream from the plasma string relative to the sweeping movement of the surface to be treated, and they are guided towards the string, in the direction opposite to the direction of the movement of the surface to be treated, at a flow rate that is sufficient for them to reach the plasma string. The products to be removed are then removed upstream from the string.

The gas particle insertion and removal means may be disposed so that the flow of gas penetrates the plasma string at any angle. However, the perpendicular direction is preferable because it makes it possible to distribute the insertion and removal gases uniformly over the entire length of the string, thereby guaranteeing uniform treatment over the entire length of the string.

When the insertion means are directed in a plane perpendicular to the direction of the plasma string, then the removal means lie in the same plane.

Figure 3:
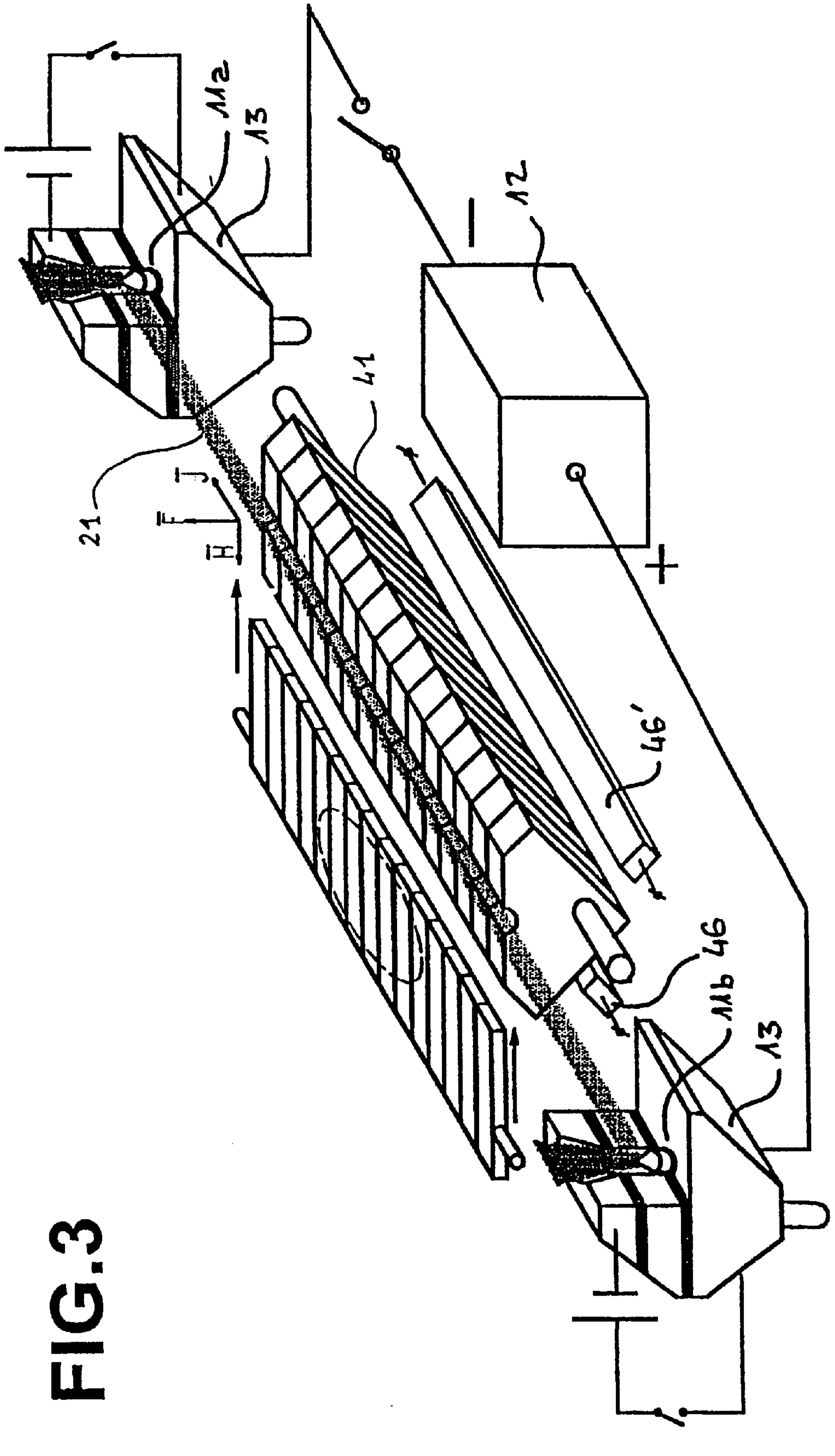
FIG. 3 is a perspective view showing a second embodiment of the device for implementing the method of the invention.

The second embodiment of the device shown in FIG. 3 differs from the preceding embodiment essentially by the fact that each of the two electrodes is replaced by a plasma jet generator.

The two plasma jets 11*a* and 11*b*, each of which is emitted by a respective generator 13 connected to a current source 12, are of opposite polarities, one of the jets 11*a* acting as the anode, while the other jet 11*b* acts as cathode. The two jets emit an electric discharge. Each of the two generators 13 is organized so that the direction of its plasma jet is preferably perpendicular to the direction of the electric discharge 21. However, any other direction different from the direction of the electric discharge may be considered for the jets.

Replacing conventional electrodes, constituted by metal poles, with such electrodes, constituted by plasma jets, offers the advantage of avoiding any pollution of the plasma string from the metal vapors that could otherwise disturb the surface treatment operations.

As shown in FIG. 3, the device may further include a magnetic field generator, e.g. in the form of two solenoids 46, 46', fed with DC and disposed parallel to the assembly of diaphragms 41, on either side thereof.

The remainder of the device is organized similarly to the preceding embodiment. Its mode of operation is similar.

Figure 4:
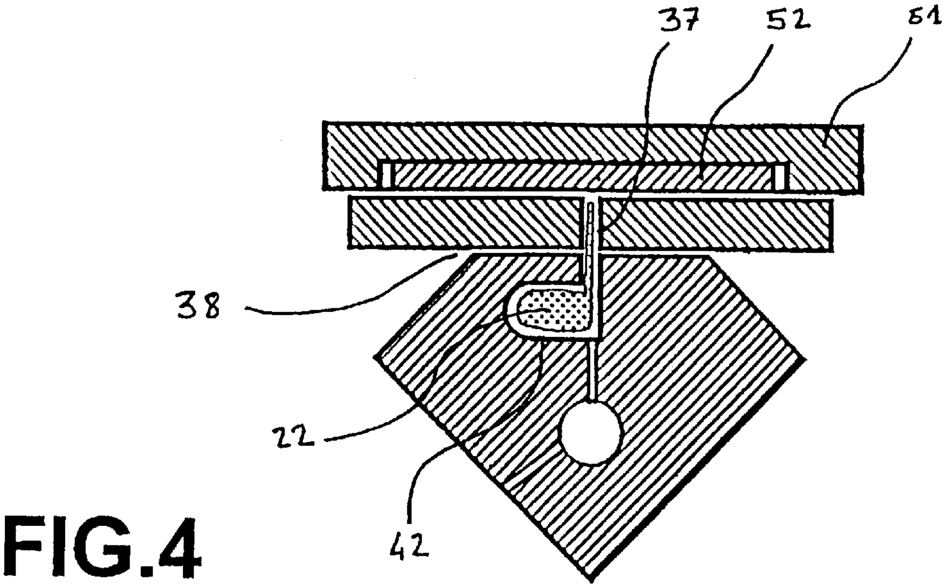
FIG. 4 is a cross-section view showing a third embodiment of the device for implementing the method of the invention.

The third embodiment of the device, shown in FIG. 4, differs from the first and second embodiments essentially by the fact that the plasma string is confined within a channel 42' provided inside the block 41, and in that a hole 37 provided in the block 41 opens the channel 42' onto the surface 51 to be treated. It is possible, by interposing diaphragm parts 61 between the block 41 and the surface to be treated, to adjust the thickness of the hole 37 at will.

The mode of operation of this device is similar to those of the preceding embodiments. Thus, an electric discharge 21 is stabilized within the channel, and a plasma string 22 is confined therein.

The advantage of the presence of the hole 37 of adjustable thickness lies in the fact that, depending on the desired treatments, it makes it possible to put the surface to be treated in contact with a plasma of temperature very close to the temperatures of the plasmas obtained in the preceding embodiments, but in which almost all electrical conductivity has been removed from the plasma. It is also possible to put the surface to be treated in contact with a plasma having a certain conductivity, by adjusting the thickness of the hole accurately. As described by Yuri P. Raïzer, in a Russian work published by Nauka in 1987 and whose title in French is "Physique des décharges dans les gaz" [Physics Of Discharges In Gases], firstly on page 215, and secondly on pages 438 to 448, it is known that the conductivity of a plasma decreases very rapidly, and exponentially going away from axis of the discharge, while the temperature of the plasma decreases less rapidly. FIGS. 5*a* and 5*b*, taken from that work, illustrate those dependences.

Preferably, as shown in FIG. 4, the hole 37 lies in a plane tangential to the channel, thereby making it possible to protect almost the entire surface to be treated from the very low residual emission of ultraviolet radiation that remains within the plasma.

Between the diaphragm parts 61 and the block 41, it is possible to provide another slot 38 which may also be used to insert the feed gases and/or to remove the products from the reaction between the activated particles in the plasma and the surface to be treated, thereby supplementing all of the above-described insertion and extraction possibilities.

This configuration makes it possible to avoid any direct contact between the surface to be treated and the non-activated (non-excited) feed gas particles, which would disturb the treatment to be undertaken. This also makes it possible to maintain the particles within the plasma during a period that is quite long, thereby imparting a higher activation (excitation) level to them.

In a fourth embodiment shown diagrammatically in FIG. 6, a pulsed AC electric discharge 21 is generated in the cavity 42 between the two electrodes 11. The electrode 11*a* is connected to the current source 12 while the electrode 11*b* is connected to ground. That electrode is equipped with an insulating screen 17 making better current distribution possible. However, such a screen is not essential.

Subject to the device being suitably adapted, other types of discharge can be applied. Thus, the current source 12 delivering a pulse current may also emit a steady current.

The cavity 42, which is also trough-shaped, is provided within a body or block 41 of dielectric material, e.g. of quartz.

The remainder of the device is organized similarly to the preceding embodiments. Its mode of operation is similar.

The four above-described embodiments of the device of the invention make it possible to stabilize an electric arc within a closed channel that is partially circularly cylindrical in shape.

In a fifth embodiment of the device, shown in FIG. 7, the channel is of "curved" shape. The material 51 whose surface is to be treated has a complex shape of the "corrugated" type. The shape of the trough in which the plasma string is confined must correspond to the shape of the surface to be treated. For this purpose, the trough defined by the cavity 42 provided within a block 41 follows an essentially curved direction that is "parallel" to the direction of the surface 51.

The remainder of the device is organized similarly to the preceding embodiments. Its mode of operation is similar.

An analogous device may be used to treat the surfaces of objects of any three-dimensional shape. To this end, the block 41 may be made of a material having a certain amount of flexibility, constituted, or example, by a polymer composition, so that the edges of the trough can, at any time during the sweeping movement, match the relief of the surface to be treated.

The sixth embodiment of the invention shown in FIG. 8 makes it possible to treat simultaneously two faces of the same material, e.g. in the form of a sheet or of a plate.

The device comprises two bodies or blocks 41. Each of the two blocks configures a cavity 42*a*, 42*b* having the same trough shape, e.g. a semi-cylindrical shape. Placed facing each other, the two troughs define an internal cavity of cylindrical shape. The two blocks 41 (not shown as such in the Figure) are separated from each other by a space 43 whose thickness substantially corresponds to the thickness of the material whose surfaces are to be treated.

It can be understood that, when a plasma string 22 is generated by means of the electric discharge within said internal cavity, the two faces of the material in the form of a sheet are treated simultaneously by sliding in the space 43.

In the seventh embodiment of the device shown in FIG. 9*a*, an AC capacitive discharge 21, e.g. at high frequency or at microwave frequency, is emitted between a central electrode 11*a* and a side electrode 11*b*. The side electrode is in the form of a metal rod that is grounded and that is placed along the surface to be treated. The electric discharge is thus stabilized by the entire length of the side electrode. The vector of the current density is directed essentially perpendicularly to the side electrode and the plasma is concentrated where the current density is highest.

The metal rod is situated in a dielectric body 41 in which a trough-shaped notch is formed. The part to be treated or "workpiece" 51 which, in this case is plane, is moved in translation. As it moves, it closes the trough, thereby forming a channel inside which the plasma is confined.

The cross-section of the device in FIG. 9*b* shows the relative configuration of the side electrode and of the surface to be treated, and it shows the position of the plasma string as well as the current lines. The plasma string is confined within the channel formed by the trough in the body of the side electrode and by the surface under treatment.

Naturally, on observing FIG. 9*a*, the person skilled in the art will easily find the manner in which to place the central electrode 11*a* so as to obtain a plasma having the shape of a string.

Thus, three variant embodiments of the device are shown in FIGS. 9*c* to 9*d*. As in FIGS. 9*a* and 9*b*, the plasma string is localized where the current density and the electric field are at their maxima. In all three variants, no trough is necessary to confine the plasma to the shape of a string.

In the variant 9*d*, the surface under treatment is flush with the plasma string.

In the variant shown in FIG. 9*c*, the side electrode has an edge directed towards the surface to be treated. In which case, the concentration of the current and the magnitude of the electric field are such that they stabilize the discharge and generate two plasma strings, one being confined by the body of the side electrode and by one of the faces of the surface to be treated (the face facing the electrode), and the other being confined against the other face of the surface to be treated (face facing away from electrode). In which case, the two faces of the material to be treated may be treated simultaneously by the two plasma strings.

The flow of activatable particles may be inserted into the plasma string similarly to the particles described in the preceding embodiments.

In the variant of FIG. 9*e*, there is no space between the electrode and the material whose outside surface (face facing away from the electrode) is to be treated. A single plasma string appears. Said string is in contact with said outside surface.

The particularity of this variant is that a capacitive electric current passes through the surface under treatment. In which case, the current intensifies the treatment by bringing the zone in which the activated and excited particles are generated towards the surface under treatment, and by sustaining the energy of the particles which diffuse towards the surface under treatment.

The eighth embodiment shown in FIG. 10*a* is particularly suitable for surface treatment of three-dimensional objects having respective axes of symmetry, such as, for example, bottles.

In this embodiment, the side electrode together with its insulating covering substantially matches the shape of the object whose surface is to be treated, i.e. a bottle in this example. In which case, the side electrode is placed outside the bottle.

The thickness of the insulating covering separating the bottle whose surface is to be treated from the side electrode can vary as a function of the distance that separates each of the points of the side electrode from the central electrode, this thickness being larger in the immediate vicinity of the central electrode. Thus, the capacitive electric current remains constant along the surface under treatment.

In addition, as shown in FIG. 10*f*, the side electrode 11*b* may be extended under the bottom of the bottle so as to enable the entire bottle to be treated.

As shown in FIG. 10*b*, the body of the side electrode may have a longitudinal notch in the form of a trough 42 that serves to confine the plasma string between the side electrode and the surface of the bottle.

The bottle is caused to rotate at a speed enabling the entire surface of the bottle to be swept during the discharge.

It is also possible to use a pulsed electric discharge, each pulsed discharge treating a portion of the surface, in the form of a strip or band of determined width dependent, in particular, on the speed of rotation of the bottle. By suitably offsetting the treated bands, it is possible to treat the entire surface of the bottle. Such a procedure is particularly advantageous when the material of the bottle cannot withstand being subjected to high temperatures for long periods. Thus, the material of the bottle can cool down between two pulses. The control over the heating up of the bottle can be further increased if the device is set to treat successively bands that are not adjacent. In a variant, it is also possible to rotate the bottle step-by-step, and to treat a given band of the bottle with a pulsed discharge each time the bottle stops.

Three embodiments are shown in FIGS. 10*c* to 10*e* and they substantially reproduce the configurations of the embodiments described with reference to FIGS. 9*c* to 9*e*. Thus, the plasma is confined in the form of one or two strings.

These three variants offer identical possibilities for treating either one of the surfaces of the wall of the bottle (outside face or inside face), and also for treating both of the faces simultaneously. Thus, the variant shown in FIG. 10*c* makes it possible to treat the outside face, the variant shown in FIG. 10*e* makes it possible to treat the inside face, while the variant shown in FIG. 10*d* makes it possible to treat both faces simultaneously.

The method of the invention for generating plasma is particularly suitable for types of treatment such as, for example, surface cleaning, surface stripping, depositing films on the surface, sterilization, etc.

In addition to treating different types of flasks or containers such as bottles, it is also particularly suitable for treating surfaces of materials that are sensitive to ultraviolet radiation, thereby making it possible to avoid photo-ionization phenomena. This type of material is encountered in micro-electronics. For example, it may be a silicon wafer that is subjected to stripping or cleaning operations, or on which a film is deposited, or else from which a photoresist film is stripped.

The method of the invention is also suitable for simultaneously treating two faces of an element in the form of a thin film, e.g. polymer films or sheets, and sheets of paper, in particular paper constituting bank notes. It may also be used for woven textile fabrics and threads, or for bottles.

The method of the invention may also be used to perform surface treatment on materials of complex three-dimensional shapes, such as, for example, certain portions of vehicle bodywork.

The method and the devices of the invention make it possible to treat large surfaces of materials with a very small volume of plasma. Such a small volume of plasma needs only very low power consumption.

Non-limiting examples of implementations of the method of the invention and how they can be applied to surface treatment of dielectric materials are given below.

EXAMPLE 1

A DC plasma string generator was built as in the embodiment shown in FIG. 3, and it was tested for stripping photoresist from silicon wafers of up to 30 cm (in particular 20 cm) in diameter, at all stages of the creation of integrated schemes. The electric current could vary from 100 A to 200 A. The potential difference between the electrodes could vary from 200 V to 300 V.

The electrodes were jets of argon plasma, output by plasmatrons whose axes of symmetry were perpendicular to the axis of the string so that the gases output by the electrodes did not have access to the plasma string, and therefore did not contaminate it.

The plasma string was formed by a series of copper diaphragms, each covered with a fine layer of silicon oxide, and separated from one another by insulating gaskets made of hard rubber. The diaphragms were cooled with water. In its periphery, each of them was provided with a cylindrical notch, organized so that, once they had been put in place in succession, and separated from one another by the insulating gaskets, they formed a partially open channel, in the manner of a trough. At its ends, the axis of the channel intersected the axes of the two plasma jets output from the electrodes. The length of the trough was, in particular, 200 mm, and its diameter was, in particular, 4 mm.

A flat support made up of plates of copper, each covered with a film of $SiO_2$, and separated from one another by insulating gaskets, traveled above the trough and tangentially to the plasma string. The support was built so that the silicon wafer to be treated could be fixed to it by means of a vacuum device causing it to adhere to the support, a recess serving to receive the wafer being provided so that the assembly comprising the silicon wafer and the support formed a plane surface.

On passing tangentially to th e plasma string, the plane surface of the support-and-silicon-wafer assembly confined the plasma string.

On passing tangentially along the string, the silicon wafer was subjected to the action of the plasma uniformly over the entire length of the string.

The space between the trough and the flat support was important to ensure that the plasma string was stabilized properly. In this example, it was 0.2 mm wide.

A feed gas containing argon, optionally helium, water vapor, oxygen, and $CF_4$ was inserted upstream from the string via a longitudinal slot parallel to the axis of the plasma string, so that the feed gas was held captive in the space (0.2 mm) between the surface of the silicon wafer, and the string. The gas decomposed and became activated in the plasma, and it stripped off the polymer material of the photoresist. Other gases or mixtures of feed gases may be considered.

It is possible to vary the flow rate of the feed gas. In the example given, it re ached 20 liters per minute (l/min). The speed of stripping of the photoresist varied in the range 1 micron per second ($\mu$m/s) to 100 $\mu$m/s, depending on the properties of the photoresist. The stripping of the photoresist layer was observed to be uniform over the entire surface of the silicon wafer. Passing the wafer over the plasma string at a speed of 0.2 meters per second (m/s) was sufficient to perform full stripping of the photoresist of a thickness of 0.4 $\mu$m. The duration of the treatment of a wafer of 20 cm in diameter was 1 s.

A magnetic field generator in the form of a solenoid, fed with DC and disposed in the vicinity of the generator, as shown in FIG. 3, was used to generate a magnetic field H perpendicular to the vector J of the current density in the plasma string. This resulted in the formation of a magnetic field of an absolute magnitude of about 10 Gauss in the zone of the plasma string.

In the direction of this field (direction of the feed current of the solenoid), the resulting Ampère force F displaced the plasma string, making it possible to change some of the treatment parameters such as, for example, the speed of stripping of the photoresist.

The tests performed on the structure of the treated silicon wafer demonstrated that there was no damage due to any ultraviolet radiation and to any bombarding of the surface of the structure with active particles of the plasma, whose kinetic energy was very low and did not exceed 0.3 eV. No trace of tungsten or of copper was detected on the treated structure, which demonstrated that the treatment took place under clean conditions, exempt from any possibility of contamination, in particular by the materials of the electrodes.

The treatment was effected at atmospheric pressure. It required no enclosure around the described device.

The same device was used to strip off silicon dioxide using a feed gas containing $CF_4$. In this case, a stripping speed of 10 $\mu$m/s was achieved, uniformly over the entire surface of the silicon wafer that was 200 mm in diameter.

The same device was used to deposit a dielectric film, e.g. of $SiO_x$, using as the feed gas argon containing hexamethyldisilasane and oxygen, where x varied in the range 1.8 to 2.1 depending on the ratio of the oxygen and silicon concentrations in the plasma formed. A speed of growth of the film of $SiO_x$ of 5 $\mu$m/s was recorded, uniformly over the entire surface of the silicon wafer. The degree of non-uniformity obtained did not exceed 1%.

In this example, the electric current generated by the plasma string was parallel to the axis of the plasma string, and thus to the surface to be treated.

EXAMPLE 2

A high-frequency current plasma string generator was built as in the model shown in FIG. 9*a*, and as in the embodiment shown in FIG. 9, and it was experimented for treating (smoothing, stripping, film deposition, surface restructuring, sterilization, deodorization, etc.) sheets of polymers, money paper, plastics parts, woven fabrics and bundles of threads made of synthetic and natural materials.

The generator operated by pulses at a frequency of 4 MHz. It included a cooled central electrode made of copper in the form of a rod. The grounded side second electrode also made of copper was surrounded by a thick (5 mm to 10 mm) layer of dielectric materials, in particular of the polycarbonfluoride type, in particular materials sold under the trademarks Teflon or POM. The cross-section of this covering had a trough shape whose axis was parallel to the axis of the central electrode.

The discharge was formed between the central electrode and the side electrode. It was concentrated in the trough and it formed a plasma string along said trough. The distribution of the parameters of the plasma along the trough could be adjusted by varying the thickness of the dielectric material covering the second electrode. In particular, a plasma string that was uniform over its entire length was obtained by using the central and side electrodes displaced relative to each other, and by varying the thickness of the dielectric material that covered the side electrode, in the range 5 to 10 mm, the higher thickness corresponding to the zone of the side electrode that was closest to the central electrode.

The discharge parameters were as follows:

Electric current up to 10 A, voltage 10 kV.

Length of the grounded side electrode, 30 cm.

The gas used for the discharge was air or a mixture of air and of argon.

The device was powered by pulses, it being possible for the duration of each pulse to vary in the range 0.001 s to 0.5 s, and the repetition frequency of the pulses was in the range 100 Hz to 1 Hz, respectively.

The surface to be treated passed tangentially to the plasma string created in the trough, in a direction perpendicular to the axis of the string, so that all of the points on the surface were subjected to the action of the string as they were exposed to it.

A support gas containing chemical components was inserted along the surface to be treated, downstream from the plasma string, via a longitudinal slot, so that the gas came into contact with the surface under treatment and with the plasma string. This gas was then activated by the plasma and the surface was treated by means of the interchange of the activated particles by diffusion between the plasma string and the surface under treatment, and by means of the plasmo-chemical reaction on said surface. That is how, by inserting oxygen and hexamethyldisilasane vapor into the support gas, a layer of silicon oxide was deposited on a PET surface. By inserting oxygen only, surface stripping and disinfection was performed on a plane surface of PET material. The speed of passing of the PET surface was in the vicinity of 1 m/s.

This device could be used to treat plane or cylindrical surfaces. For cylindrical surfaces, the axis of symmetry of the cylinder was parallel to the axis of the plasma string.

Measurements showed that the surface treatment was uniform. In particular, the resulting silicon oxide layer had a thickness of in the range 0.1 $\mu$m to 0.15 $\mu$m over the entire treated surface.

All these experiments were performed at atmospheric or subatmospheric pressure.

EXAMPLE 3

A high-frequency current plasma string generator was built as in the model shown in FIG. 10*a*, and as in the embodiment shown in FIG. 10*e*, and it was experimented for depositing films on the inside surfaces of plastics bottles.

All of the parameters used in this example were the same as those used in example 2.

These means were used to create a silicon oxide layer on PET bottles in order to obtain a barrier impermeable to oxygen, carbon monoxide, water vapor, and acetaldehyde.

Measurements showed that the resulting barrier to oxygen made it possible to reduce the permeability of the bottle to oxygen by a coefficient of up to 20. In this case, the second electrode was designed to match the shape of the surface of the bottle, taking account of the thickness of the dielectric material that covered the second electrode.

In order to ensure that all of the points of the surface of the bottle were treated, the bottle was rotated at a speed of rotation such that the entire surface of the bottle went past the plasma string at least once. It was also possible to use a pulsed electric discharge so that each discharge treated a band of surface of determined width, and so that the bands covered the entire surface to be treated.

The speed, in particular for PET bottles of 1 liter, was in the range 50 revolutions per minute (r.p.m.) to 150 r.p.m. for plasma pulse durations ranging from 0.0001 s to 0.002 s, with pause durations between pulses ranging from 0.01 s to 0.05 s.

By adjusting the parameters of the discharge (current and voltage), it was possible to obtain a plasma string that was partially stabilized by the surface under treatment, inside the rotating bottle. By injecting support gases, e.g. a mixture of hexamethyldisilasane and of oxygen into the rotating bottle before the discharge took place, it was possible to cover the inside of the surface of the bottle with a layer of silicon oxide, in particular of a thickness lying in the range 0.02 $\mu$m to 0.15 $\mu$m. This layer increased the impermeability of the PET bottle by a factor of up to 20.

It was also possible to form a plasma string outside and inside the bottle simultaneously, and thus to cover both faces (the inside face and the outside face) of the bottle with respective layers of silicon oxide, thereby increasing the impermeability of the bottle by a factor of up to 40.

All of these experiments were performed at atmospheric or subatmospheric pressure without inserting solid elements into the bottle and without using an enclosure or a solid element encasing the bottle.

EXAMPLE 4

A high-frequency plasma string generator for continuously treating (smoothing, stripping, cleaning, depositing films on) polymer sheets, money paper, strips of woven fabric, and textile threads.

This plasma string generator device differed from the device in example 2 in that the second electrode was cooled and was encased in a dielectric body, in particular made of cooled quartz, which made it possible to remove the heat given off by the high-frequency current flowing inside the dielectric material.

In this example, the electric current reached 10 A and the voltage across the electrodes reached 10 kV.

The dielectric surface under treatment that hemmed in the string and stabilized it did not necessarily need to be cooled because its speed was such that, when it was exposed to and treated by the plasma string, it was not heated up very strongly, the heat given off by the electric current being absorbed by the material of determined thermal capacity. In particular a speed in the vicinity of 1 m/s proved to be sufficient to clean a woven cotton fabric or a bundle of threads continuously, so as to remove therefrom polymer matter incorporated during weaving. A speed of 10 m/s was sufficient to launder and clean a textile thread of polymer material continuously.

The woven fabric and the bundle of threads passed tangentially to the plasma string, of a diameter, in particular, of 4 mm, in a direction perpendicular to its axis.

In another implementation, the bundles of threads may pass through the plasma string. In which case the uniformity of the surface treatment of the threads is increased.

A speed of 3 m/s under continuous conditions, was sufficient to deposit a film of silicon oxide (0.1 $\mu$m) on money paper based on cotton, in order to make it impermeable, and to make it uncopiable (for security purposes).

The treatments mentioned were performed at atmospheric pressure. They did not require any hermetic enclosure around the device.

As in the case of example 2, the current that generated the plasma string was directed essentially perpendicularly to the surface under treatment. The treatment thus consisted of a plasmo-chemical reaction when the plasma string came into contact with the surface under treatment, and also of an essentially electronic bombardment of said surface.

What is claimed is:

1. A method of treating a surface of a material or of an object by means of plasma generated by an electric discharge, wherein said discharge is stabilized by confining said plasma in the form of at least one string, and in that the surface treatment is performed by putting said surface in contact with the plasma string along said string.

2. A method according to claim 1, wherein said surface to be treated and said plasma string are subjected to a relative sweeping movement, the direction of the sweeping movement being different from the direction of the axis of said string.

3. A method according to claim 1, wherein said discharge is stabilized by confining said plasma string within at least one channel constituted in part by the surface under treatment.

4. A method according to claim 3, wherein another portion of said channel is constituted by an essentially dielectric wall in the form of a trough.

5. A method according to claim 4, wherein the composition of said plasma is sustained by a flow of gas particles, the flow being inserted and removed in a same section plane of the plasma string, perpendicular to the direction of the string, so as to control the composition of the plasma locally while avoiding any longitudinal dissipation of the plasma.

6. A method according to claim 5, wherein the insertion and removal of said gas particles is distributed along the plasma string.

7. A method according to claim 1, wherein the plasma string is subjected to the action of a magnetic field angularly positioned in a direction different from the direction of the axis of the plasma string, so as to create an Ampère force that influences the position of the axis of the string as a function of the nature of the desired treatment.

8. A method according to claim 1, wherein said electric discharge is fed with DC or AC emitted between two electrodes, each of which is constituted by a plasma jet whose axis intersects the axis of the plasma string, the direction of each of the jets being different from the direction of the electric discharge.

9. A method according to claim 1, wherein said electric discharge is fed by an AC source, and wherein said discharge is stabilized by means of an electrode disposed along the surface to be treated.

10. A method according to claim 9, wherein the discharge is fed by a pulsed current source, wherein the surface is treated discontinuously in strips or bands, and wherein a plurality of sweeping passes are performed in order to treat the entire surface.

11. A device for treating a surface of a material or of an object by means of plasma generated by an electric discharge, wherein said discharge is stabilized by confining said plasma in the form of at least one string, and in that the surface treatment is performed by putting said surface in contact with the plasma string along said string, comprising at least two electrodes organized to emit an electric discharge, and means for stabilizing said electric discharge by confining the plasma in the form of at least one string, said device being organized to perform the surface treatment by bringing the surface into contact along the plasma string.

12. A device according to claim 11, wherein said means for stabilizing the electric discharge and for confining the plasma in the form of at least one string comprise at least one channel constituted in part by the surface under treatment.

13. A device according to claim 12, wherein another portion of said channel is constituted by an essentially dielectric wall in the form of a trough.

14. A device according to claim 13, wherein the electric discharge is generated by a DC source, an AC source, or a pulsed current source, and wherein the wall in the form of a trough is constituted in a body comprising an assembly of diaphragms made of a metal material and insulated from one another by insulating gaskets, which assembly is equipped with cooling means.

15. A device according to claim 11, comprising at least one side electrode, said side electrode being encased in a dielectric body and disposed along the surface under treatment, so as to stabilize said electric discharge.

16. A device according to claim 15, wherein said side electrode is constituted by a metal rod.

17. A device according to claim 15, wherein said side electrode has an edge directed towards the surface under treatment.

18. A device according to claim 15, wherein said dielectric body encasing the side electrode is shaped to match the shape of the surface to be treated.

19. A device according to claim 11, wherein said device is organized to enable said surface to be displaced relative to the plasma string so as to perform the treatment by sweeping said surface.

20. A device according to claim 11, including insertion means and/or removal means for inserting and/or removing gas particles, making it possible to generate and then to sustain a plasma, which means are disposed in the same plane, perpendicular to the direction of said plasma string.

21. A device according to claim 20, wherein said insertion means and/or removal means for inserting and/or removing gas particles are distributed over the entire length of the plasma string.

22. A device according to claim 21, wherein said insertion means and/or removal means for inserting and/or removing gas particles are organized so as to make it possible to alternate firstly the direction of flow of the gas particles to be inserted and removed relative to the direction of the sweeping moving and/or relative to the position of the plasma string, and secondly the insertion and removal functions of said means so as to make it possible to avoid any damage to the surface to be treated or to the treated surface, upstream and downstream from the plasma, either from the activatable gas particles, or from gas particles or products to be removed.

23. A device according to claim 11, including means for generating a magnetic field, organized so that the lines of said magnetic field pass through said plasma string.

24. A device according to claim 11, wherein each of said electrodes is constituted by a generator for generating a plasma jet, organized so that the plasma jet has a direction other than the direction of said plasma string.

* * * * *